INVENTOR.
Adolf Margraf

United States Patent Office 3,605,387
Patented Sept. 20, 1971

3,605,387
POCKET FILTER FOR PURIFYING
DUST-LADEN GAS
Adolf Margraf, 196 Wiesenstr.,
4961 Wendthagen, Germany
Filed Sept. 29, 1969, Ser. No. 861,814
Claims priority, application Germany, June 10, 1969,
P 19 29 312.0
Int. Cl. B01d 46/04
U.S. Cl. 55—294
9 Claims

ABSTRACT OF THE DISCLOSURE

In a pocket filter for purifying dust-laden gas, comprising a filter chamber separated into a dust-laden gas compartment and a clean gas compartment by a wall with vertically extending slots formed therein in spaced parallel relation, and filter pockets extending through the slots into the dust-laden gas compartment secured to the slotted wall and supported by inner frames including a bridging formed by a mat of spiral springs inserted into the filter pockets and extending beyond the slotted wall into the clean gas compartment, the invention residing in that profile members are secured together with the filter pockets intermediate the slots of the slotted wall extending vertically continuously over the height of the slots and the filter pockets, the height of these profile members being such that their sides remote from the slotted wall are disposed in a common plane substantially coinciding with the plane of the vertical edges of the supporting frames within the clean gas compartment thereby forming individual passages each communicating with the interior of a filter pocket. A known cleansing gas nozzle communicating with a source of pressure gas and having a discharge opening extending over the length of the passages formed by the profiles substantially in the plane of their free sides is movable in lateral direction past the row of filter pockets. Whenever the mouth of the cleansing gas nozzle becomes aligned with a passage communicating with the interior of the respective filter pockets the flow of gas will be reversed thereby removing the dust accumulated at the outside of the filter pocket.

BACKGROUND OF THE INVENTION (1) Field of application

Pocket filters for purifying dust-laden gas have a wide field of application wherever dust-laden gas, primarily but not exclusively air, must be cleaned. This is the case in food manufacturing plants, such as flour mills, and the like, but also in other branches of industry.

(2) Description of the prior art

Pocket filters are known comprising filter pockets arranged in parallel relation in the dust-laden gas compartment of a filter chamber, the dust-laden gas passing the same from the outside to the inside, the filter surfaces of said pockets being maintained in spaced relation by inner frames including a bridging formed by a mat of spiral springs, said frames being insertable from the open side through a door in the side of the purified gas compartment and slots formed in a slotted parition between the dust-laden gas compartment and the purified gas compartment, said frames projecting into the purified gas compartment, the opening edges of said filter pockets being secured in a sealed manner to said slotted wall.

Pockt filters of this known type or pocket filters having their filter pockets secured to the slotted wall at the side of the purified gas are advantageous in so far as the filter pockets may readily be inserted into the dust-laden gas compartment and removed therefrom from the side of purified gas through the slots of the slotted wall without being annoyed by the dust. However, such pocket filters are generally merely adapted for smaller filtereing capacities, and the periodically required cleaning of the filter pockets can only be achieved by jarring means since the frames projecting into the purified gas compartment do not allow with their bridging of spiral springs or their attachments of the edges at the sides of the purified gas respectively, the application of cleansing gas discharged out of a nozzle reciprocating in the space of purified gas.

Therefore, the primary object of the invention is to provide and improve a pocket filter of the above mentioned type under maintenance of its inherent advantages in such a way that a fully automated cleaning operation with a cleansing gas discharged through a nozzle is achieved.

SUMMARY OF THE INVENTION

A pocket filter according to the invention for purifying dust-laden gas comprises:

A housing forming a filter chamber separated by a slotted wall into a compartment for dust-laden gas with an inlet opening and a compartment for clean gas with an outlet opening and a door opposite to said slotted wall, the slots of said slotted wall extending in vertical direction spaced relative to each other;

Filter pockets insertable through said door and the slots in said slotted wall into said compartment of dust-laden gas having their opening edges releasably secured to said slotted wall between adjacent slots;

Frames bridged by spiral spring mats secured to said slotted wall one exending into each of said filter pockets maintaining the same in parallel spaced relation projecting partly into said clean gas compartment with their vertical edges disposed in a substantially common plane;

Elongated profiled members for sealingly and releasably securing the opening edges of said filter pockets around the slots of said slotted wall and projecting from said slotted wall one extending into each of said filter pockets vertical free edges disposed in a common plane slightly spaced outwardly from the plane of said frame edges, wherein adjacent profiled members are defining passages out of said filter pockets into said clean gas compartment;

A discharge nozzle for cleaning gas communicating with a source of pressure gas arranged within said clean gas compartment with its discharge opening substantially disposed in the plane of the free edges of said profiled members, said discharge opening corresponding in length and width substantially to the length and width of one of said passages formed by said profiled members; and Drive means reciprocating said nozzle horizontally past said row of filter pockets, thereby reversing the flow of gas through said filter pockets upon becoming aligned therewith and removing the dust accumulated on said filter pocket in said dust-laden gas compartment.

Further objects, advantages and features of the invention will become apparent from the following description of one exemplified embodiment of a pocket filter according to the invention in connection with the attached drawing.

DESCRIPTION OF THE PREFERRED EMBODIMENT

Figure 1:
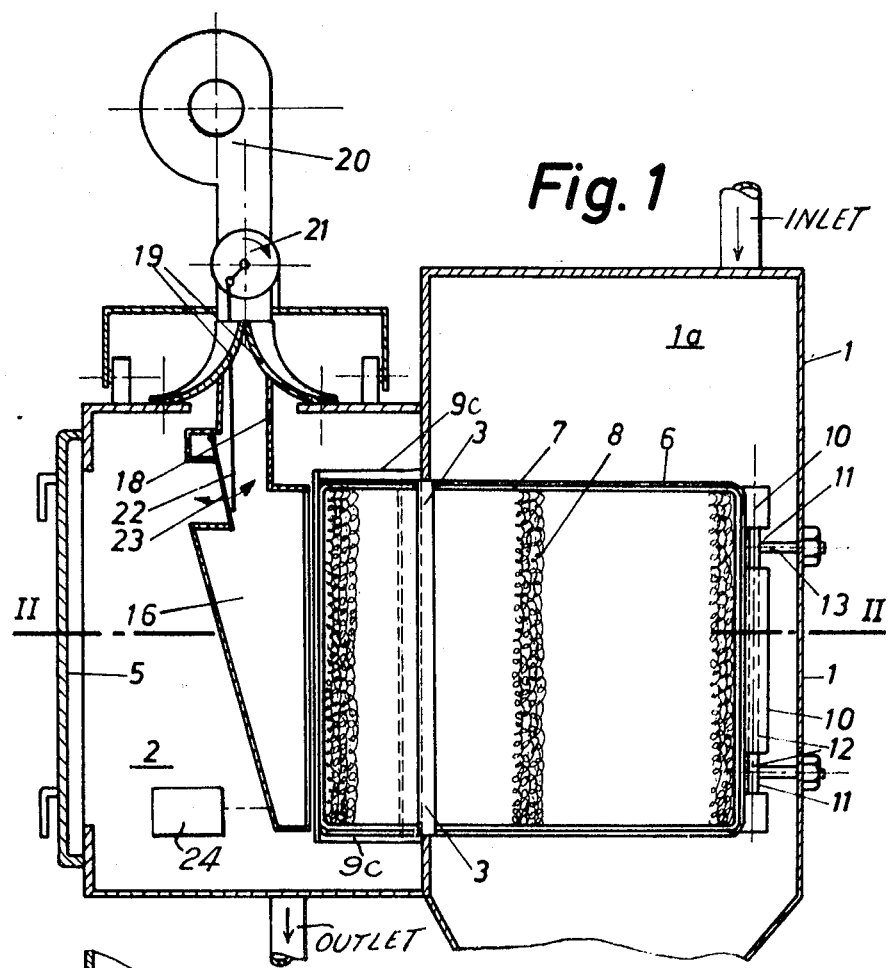
FIG. 1 is a vertical cross sectional view through a filter chamber according to the invention.
Figure 2:
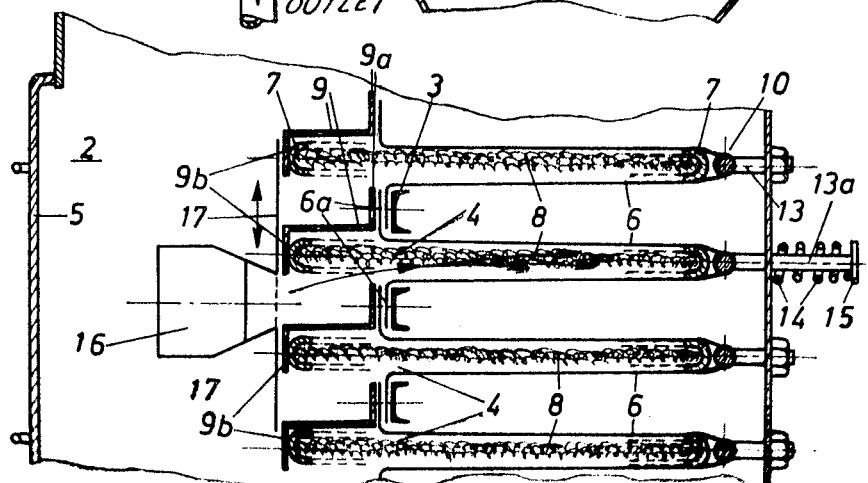
FIG. 2 is a partial horizontal sectional view taken along the line II—II in FIG. 1.

The exemplified embodiment according to the invention relates to a pocket filter including means for cleaning the filter pockets, through which the dust-laden gas passes from the outside to the inside, by means of cleansing gas discharged by a nozzle reciprocated longitudinally, in a clean gas compartment of the filter chamber.

The dust-laden gas is introduced into the filter chamber 1 at a location above the filter pockets. The dust-laden gas compartment 1a of the filter chamber 1 is separated from the clean gas compartment 2 by a slotted wall 3 having slots 4 extending continuously, or interruptedly respectively, along the height of the filter pockets. In the exemplified embodiment the slotted wall 3 consists of spaced parallel vertical U-profiles, but it is also possible to provide a continuous partition wall having parallel, vertical slots formed therein. The slotted wall 3 defines the one side of the clean gas compartment 2 accessible through at least one door 5 the number of doors depending on the length of the filter apparatus.

Each individual filter pocket 6 is inserted or pushed into the dust-laden gas compartment through the slots 4 of the slotted wall 3, wherein the edges 6a of the filter pockets 6 are initially retained in contacting engagement with the slotted wall at the clean gas side, for example by slipping apertures provided in the edges 6a over threaded studs secured in the slotted wall 3. Then a frame 7, corresponding with the height of the pocket and made of suitable profiles, for example U-profiles open towards the inside, which are bridged by a woven mat of spiral springs, is pushed into each filter pocket 6 until the frame abuts the inner end of the pocket, and in this a portion of the frame 7 with the mat projects from the slotted wall 3 into the clean gas compartment 2.

Now, according to the invention, the assembly proceeds by mounting Z-profiles, Z-section members, 9 having one of their legs provided with apertures in correspondence with the positions of the threaded studs in contacting engagement with the pocket edge 6a, whereupon the Z-profiles one after another are rigidly connected to the slotted wall 3 by screwing nuts on the threaded studs, or in any other suitable manner respectively. Preferably each Z-profile is covered at its upper and its lower end by a plate 9c. In this manner the edges 6a of the pockets are sealingly clamped between the slotted wall 3 and the legs 9a of the Z-profiles 9. The outer leg 9b of the Z-profiles being freely disposed in the clean gas compartment 2 overlaps the portion of the mat frame 7 projecting into the clean gas compartment 2, thereby preventing the frames from being displaced in a direction towards the clean gas side, and thus these mat covered frames will hold the filter surfaces of the pockets 6 in spaced relation to each other against the pressure exerted thereon by the admission of the dust-laden gas. The legs 9b of all of the Z-profiles are disposed in a common vertical plane in the clean gas compartment 2, the purpose of which shall be described hereinafter in a more detailed manner. Since the periodical cleaning of the surfaces of the filter pockets 6 is accomplished by cleansing gas, or pulsating cleansing gas respectively, it is of advantage to hold the filter pockets tensioned against the inwardly-outwardly directed cleansing gas flow, or to provide means allowing retightening respectively. To this end the vertical terminal edges of the filter pockets disposed in the dust-laden gas compartment are provided with either a plurality of loops, or a continuous loop 10 respectively, extending over the entire height of the filter pockets which is apertured, for example, at 11 at the upper and the lower end. A continuous rigid rod 12 extending from the top to the bottom is inserted through this loop 10 engaged at the apertures 11 by tension rods 13 extending through the rear wall of the filter chamber 1. The tension rods 13 of the simpler filter embodiments are formed by threaded bolts with a nut screwed thereon from the outside, thereby allowing retightening of the filter pockets 6 by tightening the same. However, it is also possible to provide a compression spring 14 at the ends of the tension rods extending through the rear wall of the chamber, which springs 14 are pretensioned and engage with their one ends the rear wall of the chamber and with their other ends abutments provided on the tension rod 13a. In this latter case locking means may be provided in the tension device preventing that the tension rod moves against the tention of the spring 14 inwardly, allowing, however, to shift the tension rod outwardly by the spring, so as to constantly tighten the filter pocket 6.

In operation the dust-laden gas passes the surfaces of the filter pockets 6 in an outward-inward direction caused by overpressure outside and underpressure inside of the filter pockets 6, and the purified gas flows through the spiral spring mat 8, the wall slots 4, and the slots formed with sufficient width between the legs 9b of the Z-profiles and the webs of the adjacent Z-profiles into the clean gas compartment 2, out of which it is discharged.

The legs 9b of the Z-profiles 9 are aligned in a common plane and these legs are forming a guide path for the mouth of a cleansing gas nozzle 16 which, in the zone of its mouth, is preferably constructed in such a manner that, when the nozzle mouth overlies one slot between the profile legs 9b, the adjacent slots are covered by laterally extending plates 17 of the nozzle 16. The cleansing gas nozzle 16 includes a connecting piece 18 projecting in a known manner through a longtiudinally extending slot into the clean gas compartment 2, which is sealed by elastic sealing lips 19 allowing the connecting piece 18 to extend therethrough in a sealed manner during its movement in longitudinal direction along the clean gas compartment 2. The connecting piece 18 communicates outwardly of the sealing lips 19 with a cleansing gas ventilator 20 which, together with the connecting piece 18 and the cleansing gas nozzle 16, may be disposed at the top of the clean gas compartment 2 and may be reciprocated in longitudinal direction by suitable control and drive means 24 in a well known manner. In order to achieve a cleaning operation of the filter surfaces by a pulsating stream of gas the connecting piece 18 may alternately be closed and opened by a flap 23 actuated, for example, by a crank drive 21 and a connecting rod 12, whereby the cleansing gas, when the nozzle mouth is overlying a slot between the legs 9b of the Z-profile, is flowing in a pulsating manner in an inward-outward direction through the filter surfaces of the filter pockets 6. It is also possible to reciprocate the cleansing gas nozzle with a relatively great velocity continuously through the clean gas compartment. Further, it is also possible to use compressed air of a compressed air source for cleaning the filter surfaces instead of using the cleansing air ventilator.

According to the invention also other profiles may be used in place of the Z-profiles which are secured to the slotted wall between the slots 4 which, however, must be constructed in such a manner that at least the one sides of the portions of the spiral spring mats 8 projecting into the clean gas compartment 2 are exposed. For example U-profiles, or the like, may be used having legs converging towards the webs into the clean gas compartment and the webs of these profiles are again disposed in a common vertical plane forming the guide path for the mouth of the cleansing gas nozzle 16. These profiles may be provided with cross pins, or the like, whereby a shifting of the mat frames 7, 8 toward the clean gas compartment 2 is prevented.

What is claimed:

1. A pocket filter for purifying dust-laden gas comprising, in combination:

(a) a housing forming a filter chamber separated by a slotted wall defining a row of slots into a compartment for dust-laden gas with an inlet opening and a compartment for clean gas with an outlet opening and a door opposite to said slotted wall, the slots of said slotted wall extending in vertical direction spaced relative to each other;

(b) filter pockets insertable through said door and the slots in said slotted wall into said compartment of dust-laden gas and having their opening edges releasably secured to said slotted wall between adjacent slots;

(c) frames bridged by spiral spring mats and secured to said slotted wall, one extending into each of said filter pockets for maintaining the same in parallel spaced relation projecting partly into said clean gas compartment with their vertical edges disposed in a substantially common plane;

(d) elongated profiled members having vertically oriented spaced legs freely disposed in said clean gas compartment, said members arranged for sealingly and releasably securing the opening edges of said filter pockets around the slots of said slotted wall and projecting from said slotted wall into said clean gas compartment with their freely disposed legs disposed in a common plane slightly spaced outwardly from the plane of said frame edges, wherein adjacent profiled members are defining passages out of said filter pockets into said clean gas compartment;

(e) a discharge nozzle for cleansing gas communicating with a source of pressure gas arranged within said clean gas compartment with its discharge opening substantially disposed in the plane of the free edges of said profiled members, said discharge opening corresponding in length and width substantially to the length and width of one of said passages formed by said profiled members;

(f) drive means reciprocating said nozzle horizontally past said row of filter pockets, thereby reversing the flow of gas through said filter pockets upon becoming aligned therewith and removing the dust accumulated on said filter pocket in said dust-laden gas compartment;

(g) tensioning means extending through the housing wall opposite to said door to engage each of the vertical closed ends of said filter pockets disposed in the dust-laden gas compartment; and (h) loops provided on the outside of said vertical closed ends of said filter pockets through which an elongated rod extends engaged at least in its upper and lower zone by tension rods extending outwardly through said housing wall.

2. A pocket filter according to claim 1, wherein each tension rod is formed as a threaded bolt with a nut screwed on its outwardly extending end.

3. A pocket filter according to claim 1, wherein each filter pocket is provided with a continuous loop merely apertured at the connections between said elongated rod and said tension rods.

4. A pocket filter according to claim 1, wherein a compression spring is arranged on the outwardly extending end of each tension rod supported in a pretensioned manner between said housing wall and an abutment provided at the outer end of said tensioning rod.

5. A pocket filter according to claim 4, wherein said tension rods are provided with locking means preventing inwardly directed movements of said tension rods.

6. A pocket filter according to claim 4, wherein said abutment at the outer end of said tension rod is formed by a nut screwed on the threaded outer end of said tension rod.

7. A pocket filter for filtering dust-laden gas comprising, in combination:

(a) a housing forming a filter chamber separated by a slotted wall defining a row of slots into a compartment for dust-laden gas with an inlet opening and a compartment for clean gas with an outlet opening and a door opposite to said slotted wall, the slots of said slotted wall extending in the vertical direction and spaced relative to each other;

(b) filter pockets insertable through said door and the slots in said slotted wall into said compartment of dust-laden gas and having their opening edges releasably fixed to said slotted wall between adjacent slots;

(c) frames bridged by spiral spring mats, each of said frames being inset into a respective filter pocket for maintaining the filter surfaces of said pockets in parallel spaced relation, and projecting partly together with a part of said mats into said clean gas compartment with their vertical edges disposed in a substantial common plane;

(d) Z-section members each with two flanges arranged in the clean gas compartment and corresponding to the length of the slots of the slotted wall, one flange of which Z-section members being releasably fixed to the slotted wall between respective slots of said slotted wall and the other flanges of said Z-section members overlapping the vertical edges of the frames and forming a second slotted wall with slots between the outer edges of the said other flanges and the webs of the section members; and (e) a slot of a discharge nozzle for cleansing gas arranged along said second slotted wall and in communication with a source of cleansing gas under pressure, said nozzle being constructed and arranged for reciprocating movement across said second slotted wall such that during the covering of the discharge slot of said nozzle with each slot of said second slotted wall cleansing gas flows into the corresponding filter pocket and passes through the filter surfaces into the dust-laden gas compartment.

8. A pocket filter according to claim 7, wherein the open edges of the filter pockets have been tightly fixed at the side of the clean gas compartment between the first slotted wall and said one flange of the Z-section members.

9. A pocket filter according to claim 7, wherein the upper and lower ends of the Z-section members are closed by plates.

References Cited
UNITED STATES PATENTS

| | | | |
|---|---|---|---|
| 1,928,670 | 10/1933 | McCrery | 55—300 |
| 2,583,039 | 1/1952 | Boesger | 55—341 |
| 2,695,681 | 11/1954 | Boesger | 55—341 |
| 2,867,289 | 1/1959 | Sare | 55—341 |
| 3,368,331 | 2/1968 | Baxendale | 55—300 |
| 3,482,378 | 12/1969 | Noland | 55—294 |

FRANK W. LUTTER, Primary Examiner

B. NOZICK, Assistant Examiner

U.S. Cl. X.R.
55—302, 341